April 9, 1968  L. D. EMERY, JR  3,376,736
BOND STRENGTH TEST APPARATUS
Filed Feb. 14, 1966

Loring D. Emery Jr.
INVENTOR.

BY Harry M. Saragovitz
Edward J. Kelly
Herbert Berl
J. Keith Fowler

United States Patent Office 3,376,736
Patented Apr. 9, 1968

3,376,736
BOND STRENGTH TEST APPARATUS
Loring D. Emery, Jr., Hamburg, Pa., assignor, by mesne assignments, to the United States of America as represented by the Secretary of the Army
Filed Feb. 14, 1966, Ser. No. 528,016
5 Claims. (Cl. 73—101)

ABSTRACT OF THE DISCLOSURE

A bond test apparatus including a circular plate mounted for rotation in a vertical plane, a pendulum pivotally suspended by its upper end from the top of one face of the plate and having holder means on its lower end for holding a test specimen, shearing means carried by the plate for engaging the specimen, and drive means for rotating the plate so that the pendulum may swing toward the shearing means into engagement with the test specimen. A bond strength measuring arrangement, including a scale on the plate and a fixed pointer, is provided.

---

This invention relates to bond strength test apparatus and more particularly to a device for testing the mechanical strength of a bond between bonded parts. For example, the invention relates to an improved bond test apparatus for testing the bond which joins parts of an electronic device, such as a diode.

In making a qualitative check of the strength of the bond joining the platinum disc and the wafer of a varactor diode, for example, prior art devices have not been successful in shearing the disc without stripping or peeling. Thus, there is a demand for test apparatus having a shearing means which is sufficiently rigid to prevent vertical forces on the disc during application of pressure. Additionally, a device is needed which provides precision adjustment of its structural elements.

To test the mechanical strength of the bond joining a pair of elements, it has been conventional to hold one element and apply a shearing force to the other element while attempting to measure the magnitude of the force required to break the bond. Because of the difficulty encountered in evenly applying the shearing force and in accurately measuring the force required to break the bond, such prior art devices have not always been satisfactory. It has also been difficult, in the use of prior art devices, to maintain the proper position of the shearing means relative to the shearable specimen during application of pressure.

Accordingly, the primary object of this invention is to provide an improved bond strength test apparatus which will overcome the described disadvantages of prior art devices.

An object of this invention is to provide a bond strength test apparatus which has means for evenly applying a shear force.

Another object of this invention is to provide bond strength test apparatus which will accurately measure the shear force required to fracture a bond.

A further object of this invention is to provide a bond test apparatus having shearing means which is sufficiently rigid to prevent vertical forces on a specimen when a shearing force is applied.

A still further object of this invention is to provide a bond test apparatus adapted for maintaining the shearing means at a proper position relative to the specimen during application of pressure.

Another object of this invention is to provide a bond test unit having reliability, simplicity, and adjustability.

These and other objects, features, and advantages of the invention will become more apparent from a careful consideration of the following detailed description when considered in conjunction with the accompanying drawing, in which.

Figure 1:
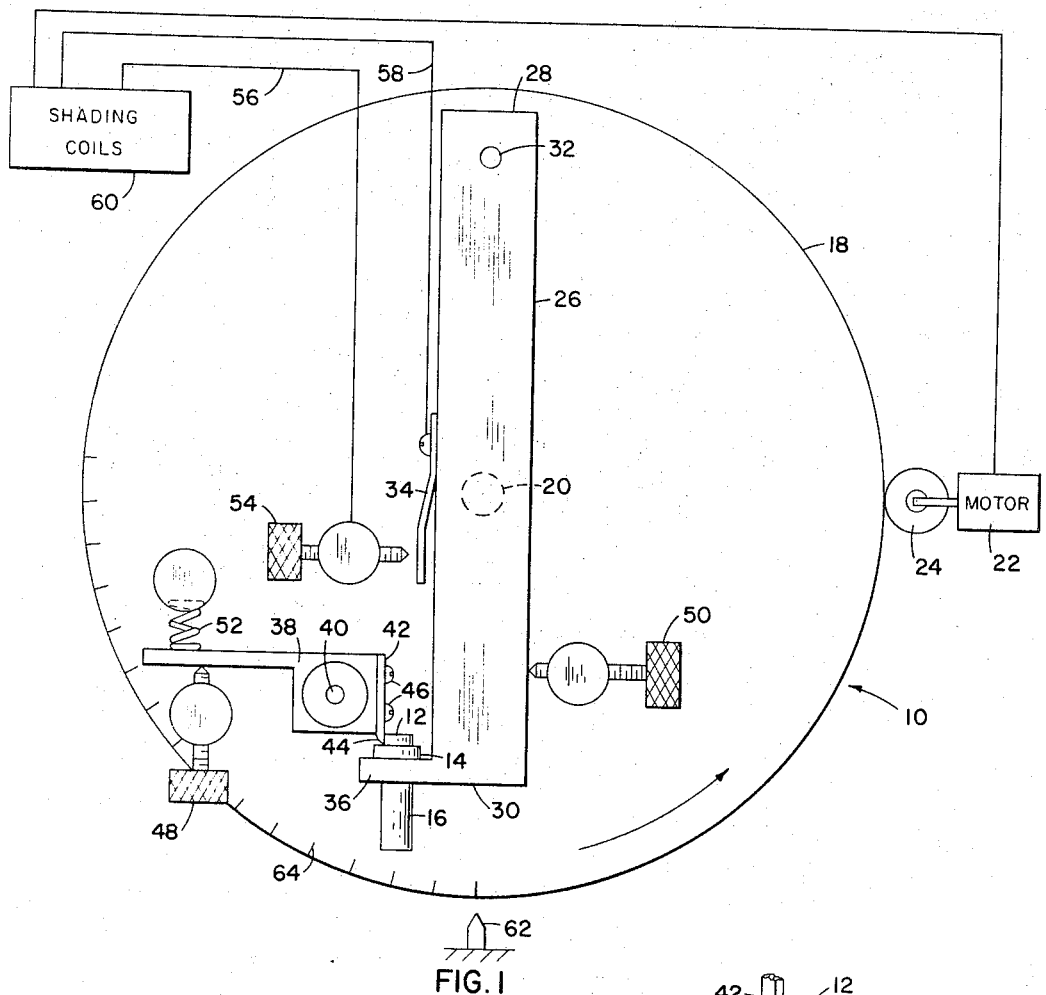
FIGURE 1 is a schematic elevation view of the test apparatus, this view illustrating the elements of the apparatus in a position just prior to application of a shearing force.

Referring now in detail to the drawing, wherein like reference numerals designate corresponding parts in the several views, the illustrative embodiment of the present invention includes bond test apparatus 10 for testing the strength of the bond joining two bonded elements such as the contact disc 12 and the wafer 14 of a diode 16.

Test apparatus 10 includes a circular support disc or plate 18 which is mounted as at 20 (phantom, FIGURE 1) for rotation in a vertical plane. Plate 18 is rotatably driven by a reversible, shaded-pole motor 22 through an intermediate drive means 24 engaging the periphery of the plate. A pendulum 26 is pivotally mounted adjacent its upper end 28 as at 32 to plate 18. Thus, the pendulum is suspended pivotally from the top of plate 18 so that the pendulum is normally co-linear with the vertical diameter of the plate (FIGURE 1). The lower end 30 of the pendulum is provided with a holder 36 for holding diode 16 or the like specimen to be tested. A shearing member 38 is pivotally supported on plate 18 in a position adjacent the holder. The shearing member has a blade 42 affixed to its forward, vertical face, the blade having a cutting edge 44 at its lower end. Blade 42 may be adjusted to a finite degree vertically as by a plurality of screws 46. A pair of adjusting screws 48, 50 are provided for respectively pivoting the pendulum and the shearing member to a relative position wherein the pendulum is co-linear with the vertical diameter of plate 18 and wherein the cutting edge of the blade just engages contact disc 12 of the diode (FIGURE 1). A compression spring 52 is positioned to bias the shearing member against the end of adjusting screw 48 and to maintain the shearing member blade in position against contact disc 12. A third adjusting screw 54 is provided on disc 18 adjacent flat spring contact element 34 secured to pendulum 26. Adjusting screw 54 and contact element 34 are respectively connected electrically as by lines 56, 58 to the shading coils, indicated diagrammatically at 60, of motor 22.

To position the apparatus for testing the bond between elements 12 and 14 of diode 16, the parts of test apparatus 10 are initially positioned as shown in FIGURE 1 with knife edge 44 of blade 42 just engaging contact disc 12. In this position, the pendulum is co-linear with the vertical diameter of plate 18, and blade 42 is positioned in a plane parallel with the adjacent side face of the pendulum (FIGURE 1). Screw 50 is used to move the pendulum to its position co-linear with the vertical diameter of the plate while screw 48 is used to position the cutting edge of the shearing blade into engagement with contact disc 12.

Operation

Figure 2:
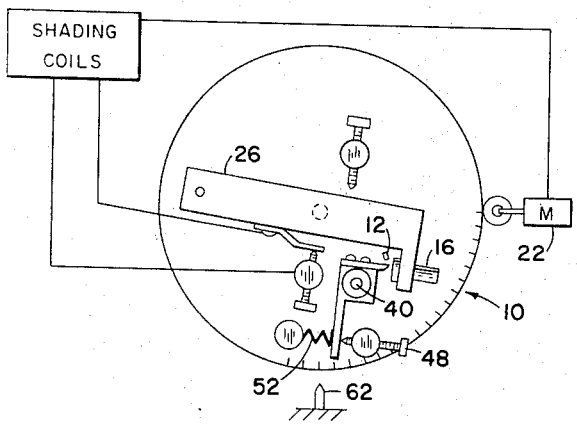
FIGURE 2 is a view similar to FIGURE 1, but the elements of the apparatus are shown in the position just after fracturing the bond between the bonded elements of the specimen.
Figure 3:
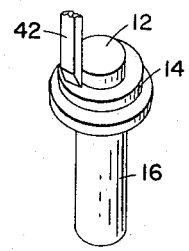
FIGURE 3 is an enlarged, detailed view illustrating the cutting edge of the shearing blade positioned against the specimen just prior to application of a shearing force.

In operation of the test apparatus, motor 22 through intermediate drive means 24 is operated to rotate plate 18 in a counterclockwise direction. Because of its tendency to seek a vertical position, pendulum 26 forces contact disc 12 against knife edge 44, the force exerted by the pendulum being proportional to the angle of rotation of plate 18. The plate continues to rotate until the force exerted on contact disc 12 of the diode causes shearing of the contact disc from wafer 14, whereupon spring contact element 34 on the pendulum engages the end of screw 54 (FIGURE 2) to complete a shorting circuit across shading coils 60 of motor 22, thereby braking the motor. Thus, FIGURE 2 illustrates the test apparatus in apparatus in a position just after breaking the bond between elements 12 and 14. The shearing force is then determined by noting the angle of rotation of plate 18. For convenience, in determining the shearing force, a fixed pointer 62 may be provided may be provided and a graduated scale 64 may be provided on the outer peripheral portion of plate 18. After fracturing the bond and removing diode 16 from holder 36, another specimen may be secured therein by mere adjustment of screws 48 and 50 to increase the distance between the blade and the adjacent face of the pendulum.

While the foregoing is a description of a preferred embodiment of the invention, the following claims are intended to include those modifications and variations that are within the spirit and scope of the invention.

What is claimed is:

1. Bond strength test apparatus for testing the strength of a bond joining a first and a second element, said apparatus comprising: a circular plate mounted for rotation in a vertical plane; a pendulum pivotally suspended from the top of one face of said plate, said pendulum being normally disposed in co-linear relation with the vertical diameter of said plate and adapted for swinging movement in a vertical plane continguous the plate; holder means carried by the lower end of said pendulum for receiving and holding said first element, said holder means extending laterally from one side of said pendulum; shearing means pivotally supported on said plate in spaced relation with said one side of said pendulum and disposed for pivotal movement in the same vertical plane with said pendulum; said shearing means further including a blade having a knife edge for abutting engagement with said second element; driving means operably connected with said plate for rotating said plate in a direction causing said vertically disposed pendulum to place a shearing force on said second element against the knife edge of said blade; and means carried by said plate for stopping rotation thereof upon breaking the bond between said first and second elements.

2. Bond strength test apparatus as defined in claim 1 wherein first adjusting means is provided on said plate for moving said pendulum to a position co-linear with the vertical diameter of the plate, and wherein second adjusting means is provided for moving the shearing means to a position in which said blade is substantially parallel with said one side of the vertically suspended pendulum.

3. Bond strength test apparatus as defined in claim 2 wherein a fixed pointer is provided, and a graduated scale is provided on the outer peripheral portion of said plate whereby the shearing force required to break the bond may be determined.

4. Bond strength test apparatus as defined in claim 1 wherein said driving means includes a reversible, shaded-pole motor operably connected with said plate.

5. Bond strength test apparatus as defined in claim 4 wherein said means for stopping rotation of the plate includes an adjustable contact screw secured to the plate above said shearing means and a flat spring contact element secured to the side of the pendulum adjacent said contact screw, both said contact element and said contact screw being electrically connected with the shading coils of said motor so as to short the coils upon engagement of said contact element and said contact screw.

References Cited
UNITED STATES PATENTS

| | | | |
|---|---|---|---|
| 2,186,824 | 1/1940 | Dietert | 73—94 |
| 2,227,226 | 12/1940 | Martin | 73—101 |
| 3,212,326 | 10/1965 | Holt et al. | 73—101 |

RICHARD C. QUEISSER, *Primary Examiner.*

J. H. WILLIAMSON, *Assistant Examiner.*